Oct. 4, 1966   J. A. PSENKA   3,276,100
BROACH
Original Filed April 10, 1961   3 Sheets-Sheet 1
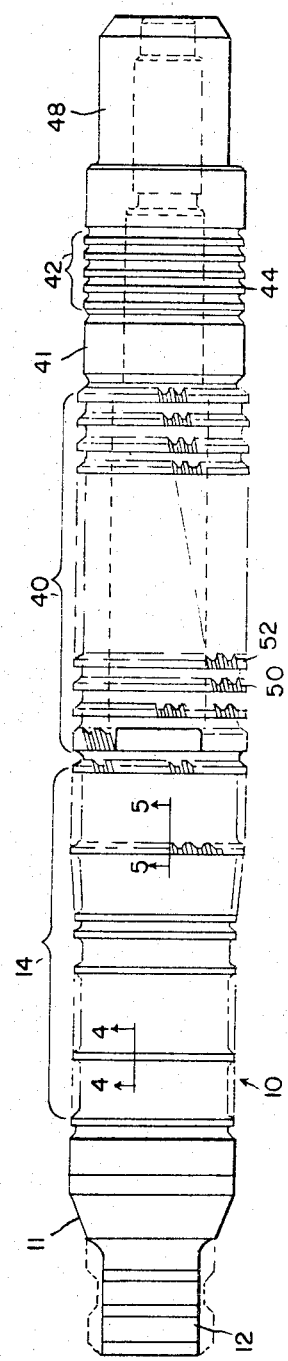
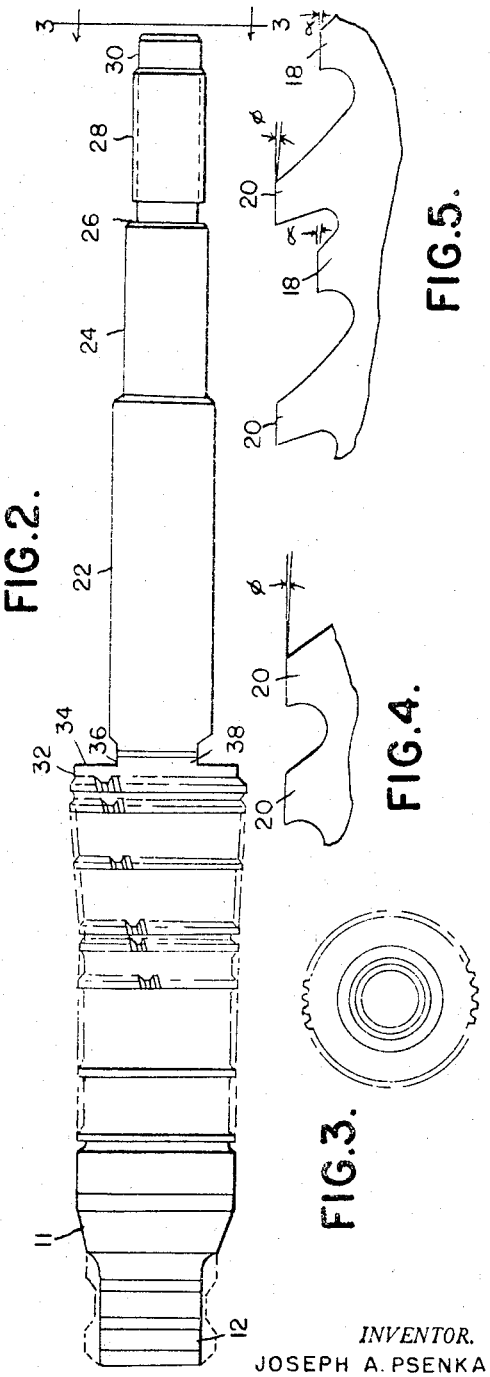
INVENTOR.
JOSEPH A. PSENKA
BY
ATTORNEYS

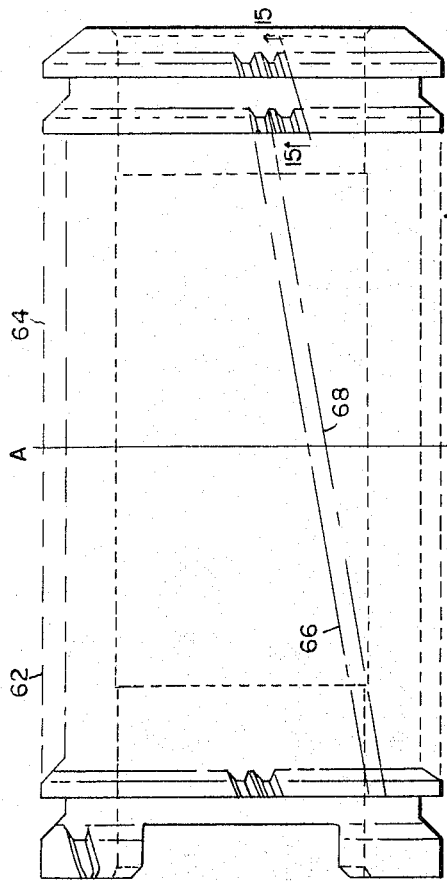
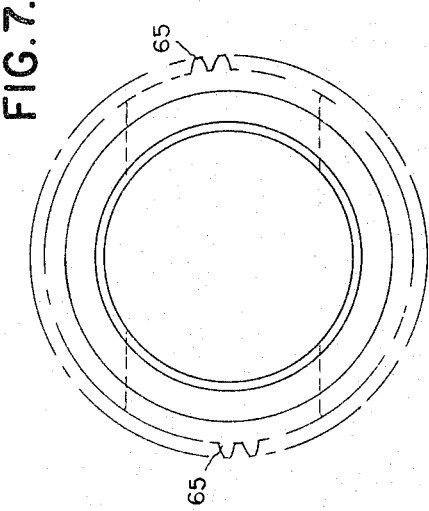
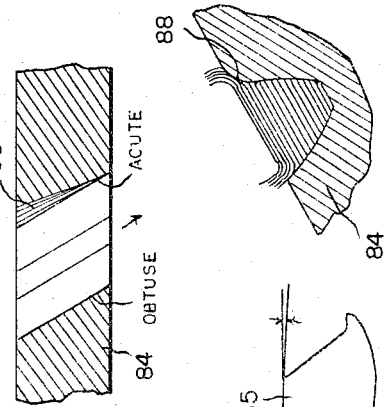
INVENTOR.
JOSEPH A. PSENKA

Oct. 4, 1966   J. A. PSENKA   3,276,100
BROACH
Original Filed April 10, 1961   3 Sheets-Sheet 3
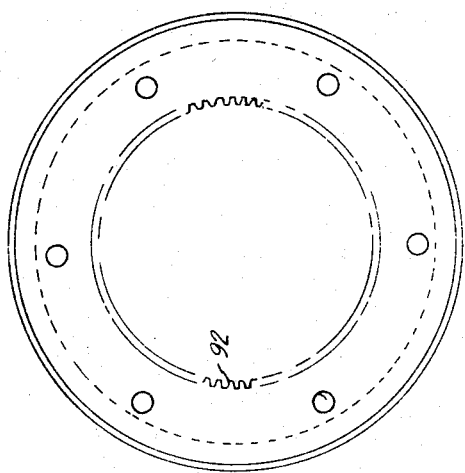
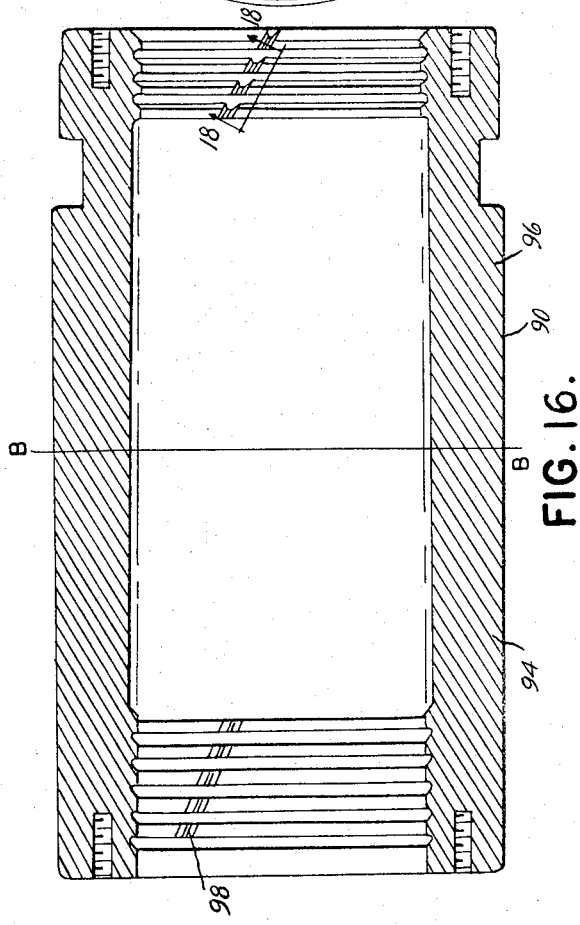
INVENTOR.
JOSEPH A. PSENKA
BY
ATTORNEYS

United States Patent Office 3,276,100
Patented Oct. 4, 1966

3,276,100
BROACH
Joseph A. Psenka, Bloomfield Hills, Mich., assignor to National Broach & Machine Company, Detroit, Mich., a corporation of Michigan
Original application Apr. 10, 1961, Ser. No. 101,887, now Patent No. 3,178,800, dated Apr. 20, 1965. Divided and this application Oct. 19, 1964, Ser. No. 404,631
12 Claims. (Cl. 29—95.1)

The present invention relates to a broach and is a division of my copending application U.S. 101,887, filed April 10, 1961, now Patent No. 3,178,800 granted April 20, 1965. More particularly this invention relates to a broach comprising a plurality of sections, a leading one of which is a roughing section adapted to rough out the teeth of a gear or splined element, and a following section in the form of a finishing section adapted to finish the teeth of the workpiece with extreme accuracy.

Broaches of the type described have been utilized in the industry. However, certain problems have been encountered. One of the main problems is that the side of the part which is produced by the obtuse side of the broach has more stock removed from it than from the side of the part which is produced by the acute side of the broach. This usually results in the acute side not cleaning up fully so that the errors of form introduced into the part by the roughing section of the broach are not entirely corrected or eliminated by the side shaving shell forming the finishing section of the broach.

The present invention relates primarily to means for correcting errors of form in the broach part which are introduced into the part by the roughing section of the broach. This is accomplished by providing an improved side shaving shell which is adapted to be mounted at the rear of the roughing section of the broach so as to completely removed the aforesaid errors.

It is an object of the present invention to provide a broach of the character described in which the finishing section is connected to the leading roughing section in such a manner that the finishing section will locate itself accurately in the workpiece and will therefore produce teeth on the workpiece which, for practical purposes, have the same accuracy as the teeth on the finishing section of the broach.

Another object of the present invention is to provide a broach which includes a side shaving shell that has on the front half of the side shaving shell cutting teeth in which the obtuse sides thereon are straight so as to actually follow the helix without any backoff angle and the acute sides thereon are backed off to provide the cutting and on the rear half of the shell the acute sides of the cutting teeth are straight so as to become guiding teeth and the obtuse sides are backed off to perform the cutting.

A further object of the present invention is to provide a broach which includes a side shaving shell having the teeth thereon so arranged as to equalize the amount of stock removal from both the acute and the obtuse sides.

A still further object of the present invention is to provide a broach having a series of longitudinally aligned finish cutting teeth for finishing a groove in a workpiece, each of the teeth having a front cutting edge having an acute corner and an obtuse corner formed by the intersection of the cutting edge with the acute side and obtuse side respectively, said series comprising a first group of teeth in which each tooth has one of the sides adapted to bear against one side wall of the groove to provide accurate guiding action in the workpiece and the other side inclined or tapered inwardly away from the other side wall of the groove from the front to the rear of the tooth, and a second group of teeth in which each tooth has the other side adapted to bear against the other side wall of the groove to provide accurate guiding action in the workpiece and the one side inclined or tapered inwardly away from the one side wall of the groove from the front to the rear of the tooth.

Another object of the present invention is to provide a broach of the aforementioned type in which the first group of teeth has the obtuse sides adapted to bear against the one side wall of the groove and the acute sides inclined or tapered inwardly.

Still another object of the present invention is to provide a broach of the aforementioned type in which the corners between the cutting edges and the sides adapted to bear against the side walls of the groove are chamfered.

A further object of the present invention is to provide a broach of the aforementioned type in which the corners between the cutting edges and the sides adapted to bear against the side walls of the groove are rounded.

A still further object of the present invention is to provide a broach of the aforementioned type in which the corners between the cutting edges and the sides adapted to bear against the side walls of the groove are provided with a long lead.

Another object of the present invention is to provide a broach of the aforementioned type which is in the form of either an external broach or an internal broach.

It is thus another object of this invention to provide a simplified low cost structure of the aforementioned type having certain advantages contributing to efficiency, reliability and long life as well as ease of maintenance.

Other objects and features of the invention will become apparent as the description proceeds, especially when taken in conjunction with the accompanying drawings illustrating preferred embodiments of the invention, wherein:

FIGURE 1 is a side elevation of the broach assembly.

FIGURE 2 is a side elevation of the leading roughing section of the broach.

FIGURE 3 is an end view of the leading section of the broach seen from the right in FIGURE 2.

FIGURE 4 is an enlarged view of adjacent teeth illustrated in FIGURE 1 taken on the line 4—4 thereof.

FIGURE 5 is an enlarged view of adjacent teeth illustrated in FIGURE 1 taken on the line 5—5 thereof.

FIGURE 6 is an enlarged side elevation of a side shaving shell.

FIGURE 7 is a right hand end view of the shell shown in FIGURE 6.

FIGURES 8–10 are various modifications of a finishing tooth having the acute side backed off.

FIGURES 11–13 are various modifications of a finishing tooth having the obtuse side backed off.

FIGURE 12A is a front view of the tooth looking in the direction of arrow 12A—12A of FIGURE 12.

FIGURE 14 is a diagrammatic plan view of a portion of a workpiece illustrating the generating lines caused by the teeth of the broach.

FIGURE 14A is a diagrammatic view of the profile of the broach part illustrating the traces of the teeth of the broach.

FIGURE 15 is a side view of a pair of adjacent teeth looking in the direction of line 15—15 of FIGURE 6.

FIGURE 16 is a sectional elevational view of an internal finishing shell which is adapted to finish external parts.

FIGURE 17 is a right hand end view of the shell shown in FIGURE 16.

FIGURE 18 is a view of longitudinally aligned teeth looking in the direction of arrow 18—18 of FIGURE 16.

In the broaching of internally toothed members, such as internal gears, spline members or the like, it is possible to produce broaching elements having substantially any required degree of accuracy. However, in use, such a broaching element can reproduce itself with substantially perfect accuracy only when it is not subjected to negative factors occasioned by an earlier stage of the broaching operation. The present invention relates to a broach which has a roughing section and a finishing section, with the finishing section taking the form of a replaceable side shaving shell which is affixed to and located on the rear end of the broach body following the roughing section, such as disclosed in my Patent 2,987,801 which issued on June 13, 1961. Certain aspects of the invention may be embodied in a finishing broach construction whether formed as a part of a broach including the finishing construction or formed as a separate broach.

Referring now to the drawings, the leading section of the broach assembly 10 is shown in FIGURES 1 and 2 and is designated by the numeral 11 and comprises a head 12 adapted to be connected to a suitable device for pulling the broach through a hole in a workpiece. Conveniently, the roughing section of the broach is indicated generally at 14 and includes a series of continuous interrupted annular blades or ribs 16 adapted to form separate cutting teeth 20. The rear part of the roughing section includes alternate round and spline teeth. The round teeth or blades 18 are adapted to machine the hole in the workpiece to true cylindrical formation. The spline cutting teeth 20 are progressively stepped from front to rear and are backed off on the top at an angle Phi and the sides thereof are relieved to within 1/64 inch to 3/64 inch of the top of the profile. The round teeth 18 are also backed off at an angle Alpha.

It will be appreciated that the cutting teeth 20 are arranged in axial alignment if the broach 10 is for the purpose of producing spur teeth, or in helical alignment if the broach is for the purpose of producing helical teeth. The term "longitudinal alignment" or the like is intended to cover arrangements for producing both spur and helical gears.

At the following end of the roughing section 14 of the broach assembly 10 is a cylindrical support 22 having a reduced portion 24 which forms a shoulder 26. Rearwardly of the reduced portion 24 a support portion 22 is threaded as indicated at 28. Rearwardly of the threaded portion 28 is provided a cylindrical support portion 30.

Directly to the rear of the final blade of the roughing section 14 there is a cylindrical surface 32, the opposite sides of which are machined away as indicated to form rearwardly facing flat abutment surfaces 34 and radially outwardly facing flat surfaces 36. This arrangement provides a flat transversely extending key 38. As shown in FIGURE 1, the following finishing broach section or side shaving shell 40 is assembled on the support portion 22 of the leading section 11. Rearwardly of the finishing section or shell 40 is located a spacer 41 followed by a round shell 42 comprising a plurality of continuous round uninterrupted blades or ribs 44. The finishing shell 40, spacer 41 and side shaving shell 42 are retained on the support portion 22 of the leading section 11 in assembled relation by nut 48 threaded to the threaded portion 28 of the leading broach section 11.

The finishing section or shell 40 is essentially tubular in shape having toothed cutting blades 50 forming longitudinally aligned series of cutting teeth 52. Again, the cutting teeth extend in axially disposed series if the broach 10 is to form a spur member and the series are helically aligned if the broach 10 is used to produce helical teeth on the workpiece. At the leading end of the finishing section 40, a notch or keyway is provided which extends diametrically across the leading end thereof and is dimensioned to receive the key 38 at the following end of the roughing section of the broach. The finishing section 40 is generally provided with a central opening, the intermediate portion of which is enlarged to provide clearance and the ends of which are of slightly reduced size to provide guide surfaces which are guidingly received on the cylindrical surface of the support portion 22 of the leading section 11 of the broach 10.

It will be observed in FIGURE 1 that the nut 48 has the front portion or forward end thereof engageable with the rear end of the round shell 42 so as to urge the spacer 41 into engagement with the shoulder 26. With such a key and keyway construction between the roughing and finishing sections a small clearance in the amount of .002 inch is sufficient to permit limited circumferential relative movement between the roughing and finishing broach sections. In addition, the key and keyway constructions of the sections are properly related with respect to the cutting teeth thereon so that the cutting teeth 52 on the finishing section are in substantial true alignment with the teeth 20 of the roughing section. Nevertheless, as the finishing section 40 moves into action, it is permitted to float so that it aligns itself with substantial perfect accuracy with respect to the teeth as partially roughed out by the roughing section of the broach. The teeth 52 of the finishing section 40 are of less height than those of the roughing section and hence, cut only on the sides. The top portions of the teeth 52 are thus able to pass in clearance through the grooves or slots provided at the bottom of the tooth spaces cut by the roughing section. The widths of the side shaving teeth increase from front to rear. The broach assembly just described is disclosed in the aforesaid Patent 2,987,801.

Certain problems have been encountered with the use of side shaving shells 40 of the type just described in that the side of the part which is produced by the obtuse side of the broach has more stock removed from it than from the side of the part which is produced by the acute side of the broach. This results sometimes in the acute side not cleaning up entirely so that the errors of form introduced into the broach part by the roughing section are not eliminated by the side shaving shell in a practical length of shell.

In order to compensate for this particular condition, the amount of stock removal on the circular tooth thickness has been increased from .002 inch to .005 inch. In addition, an entirely new approach in design is utilized such that on half the cutting teeth of the shell the obtuse side will be straight without any backoff angle so as to actually follow the helix and the acute side thereon is backed off to provide the cutting. The straight obtuse side provides a control side and as the broach moves along through the part, the obtuse side keeps or prevents the part from drifting into it. Due to the fact that the obtuse side has no backoff angle, the cutting is accomplished entirely on the acute side. On the remaining or rear half of the broach, the acute side is straight with no backoff angle and provides a control side which keeps the part from drifting into it while the obtuse side is backed off and provides the requisite cutting action. In this manner, the amount of stock removal from both the acute and obtuse sides is equalized.

FIGURE 6 shows a side shaving shell 60 which is adapted to fit on the roughing section in the manner similar to that described for FIGURE 1. Line A—A of FIGURE 6 divides the shell 60 into two halves or parts of substantially equal widths which are designated by the numerals 62 and 64. The obtuse sides of the longitudinally aligned side cutting teeth 65 are represented diagrammatically by the line 66. The acute sides of the longitudinally aligned side cutting teeth 65 are diagrammatically represented by the line 68. In the shell part 62 of the side shaving shell 60, the obtuse sides are straight with no backoff angle, thereby providing guiding action, while the corresponding acute sides are backed off and provide the requisite cutting action. The reverse is true for the broach part 64 in that the obtuse sides are backed off and provide the requisite cutting, while the acute sides are straight and provide the necessary guiding action.

FIGURES 8–10 represent the construction of a tooth 61 in the first half or part 62 of the shell 60. FIGURE 8 shows a tooth 61a having a cutting edge 70, with the acute side thereof backed off at an angle φ. The obtuse side of the tooth 61a is straight so as to provide guiding action to prevent the broach part from drifting into the acute side.

FIGURE 9 shows another modification of the tooth designated by the numeral 61b. The cutting edge 72 has a chamfer 74 which insures that there will be no cutting action on the obtuse side. The acute side of the tooth 61b is backed off at an angle φ. While the cutting edge 72 has a chamfer 74, it should of course be understood that chamfer 74 may be rounded or take another form or shape so as to prevent cutting action on the obtuse side of the tooth 61b.

FIGURE 10 is still another modification of the tooth 61b as represented by the numeral 61c. The tooth 61c has a cutting edge 76 which has a long lead 78 on the obtuse side, with only approximately 1/16 or 1/8 of an inch of the obtuse side, as represented by the numeral 80, providing the requisite guiding action. The advantage of this construction over a straight chamfer or a round corner, as described for FIGURE 9, is successive face sharpenings on a broach utilizing a long lead does not require additional work chamfering the side of the tooth profile. With the construction shown in FIGURE 9, the chamber 74 would have to be put back on the tool or broach after enough face sharpenings have been made on the broach to remove it. The length of the obtuse portion 80, which provides the small amount of guide surface, will depend upon the particular application. In any event, enough guide surface 80 has to be present to prevent metal pickup on the obtuse side. However, in certain applications, if the long lead 78 can be incorporated without metal pickup, it would be more desirable from a maintenance standpoint than to have very abrupt chamfers at the face of the broach.

FIGURES 11–13 represent modifications of the tooth as contained in the rear half or part 64 of the shell 60. Tooth 61d has a backoff angle Phi on the obtuse side, with the acute side being straight and providing the requisite guiding action.

In FIGURE 12, a tooth 61e is backed off on the acute side and the cutting edge thereof, as represented by the numeral 80, has a chamfer 81 so as to prevent metal pickup. The remaining portion of the acute side is straight so as to provide the requisite guiding action. This figure is similar to FIGURE 9.

FIGURE 13, whch is similar to FIGURE 10, has the obtuse side backed off at an angle Phi, with the acute side having a long lead 82.

Referring now to FIGURES 14 and 14A, there is diagrammatically illustrated the manner in which the teeth of the broach moving through the workpiece 84 in the direction of the arrow produce a plurality of generating lines as represented by numeral 86. The generating lines occur on the acute side and result in a rounding off of the profile as indicated at 88 in FIGURE 14A. As a result of the drift, the side of the tooth space which was cut by the acute cornered sides of the broach teeth is deformed as indicated by numeral 88. Thus, both lead and profile of the broach surface are in error. On the other hand, the side produced by the acute side of the broach shows no error and is correct throughout as to lead and profile.

FIGURE 16 shows an internal shell broach 90 for producing external parts. The shell broach 90 is adapted to follow either a generating type shell, a Fellows gear shaped gear or a hobbed gear. The longitudinally aligned finish cutting teeth 92 increase in tooth width from the front of the shell to the rear, the amount of stock removal being dependent on this increase in tooth width. The sides of the teeth are backed off sharp.

The backoff angles Phi and Alpha are the backoff angles of the obtuse and acute sides of the teeth respectively. The backoff angles may be equal or of greater magnitude one to the other. The center line of the teeth 92 may either follow a true lead or a higher or lower than true lead.

The broach shell 90 is divided in half about line B—B so that on the forward half or part 94 of the shell 90, the obtuse sides of the teeth are straight or unrelieved and the acute sides are backed off to provide the requisite cutting action. In the rear half or part 96 of the broach shell 90, the obtuse sides are backed off to provide the requisite cutting action and the acute sides are straight or unrelieved. By straight is meant teeth which are parallel to either a true lead or a desired higher or lower lead.

The first tooth 98 of the broach may be either a pilot tooth, that is, a non-cutting tooth with an entering lead, or it may be an exceptionally heavy bumber tooth backed off on the sides to initiate some cutting.

The teeth 92 may be constructed and arranged according to the teachings of FIGURES 8–13 inclusive.

The drawings and the foregoing specification constitute a description of the improved broach in such full, clear, concise and exact terms as to enable any person skilled in the art to practice the invention, the scope of which is indicated by the appended claims.

What I claim as my invention is:

1. A broach having a series of longitudinally aligned finish cutting teeth for finishing a groove in a workpiece, each of said teeth having a front face having an acute corner and an obtuse corner formed by the intersection of said face with the sides thereof, said series comprising a first group of teeth in which each tooth has one of said sides adapted to bear against one side wall of the groove in non-cutting relation to provide accurate guiding action in the workpiece and the other side tapered inwardly away from the other side wall of the groove from the front to the rear of the tooth to form a cutting edge, a second group of teeth in which each tooth has the other side adapted to bear against the other side wall of the groove in non-cutting relation to provide accurate guiding action in the workpiece and said one side tapered inwardly away from the one side wall of the groove from the front to the rear of the tooth to form a cutting edge.

2. A broach defined in claim 1 in which the first group of teeth has the sides forming the obtuse corners adapted to bear against the one side wall of the groove in non-cutting relation and the sides forming the acute corners tapered inwardly.

3. A broach defined in claim 1 in which the corners between the faces and the sides adapted to bear against the side walls of the groove in non-cutting relation are chamfered.

4. A broach defined in claim 1 in which the corners between the faces and the sides adapted to bear against the side walls of the groove in non-cutting relation are rounded.

5. A broach defined in claim 1 in which the sides at the corners between the faces and the sides adapted to bear against the side walls of the groove in non-cutting relation are provided wtih a long lead.

6. A broach assembly for finishing a groove in a workpiece comprising a leading section having longitudinally aligned series of progressively stepped cutting teeth, a support portion following said cutting teeth having a support surface, a finishing broach shell mounted on said support surface, said shell having a series of longitudinally aligned finish cutting teeth, each of said finish cutting teeth having a front face having an acute corner and an obtuse corner formed by the intersection of said face with the sides thereof, said series comprising a first group of finish cutting teeth in which each tooth has one of said sides adapted to bear against one side wall of the groove in non-cutting relation to provide accurate guiding action in the workpiece and the other side inclined inwardly away from the other sde wall of the groove from the front to the rear of the tooth to form a cutting edge, a second group of finish cutting teeth in which each tooth has the other side adapted to bear against the other side wall of the groove in non-cutting relation to provide accurate guiding action in the workpiece and said one side inclined inwardly away from the one side wall of the groove from the front to the rear of the tooth to form a cutting edge, and means for retaining said shell on said support portion.

7. The broach assembly defined in claim 6 wherein said first and second groups of finish cutting teeth are located on the front and rear halves respectively of said shell.

8. The broach assembly defined in claim 6 wherein the side of each tooth which is inclined inwardly is provided with a tapered surface.

9. The broach assembly defined in claim 6 in which the first group of finish cutting teeth has the sides forming the obtuse corners adapted to bear against the one side wall of the groove and the acute sides inclined inwardly.

10. The broach assembly defined in claim 6 in which the corners between the faces and the sides adapted to bear against the side walls of the groove in non-cutting relation are chamfered.

11. The broach assembly defined in claim 6 in which the corners between the faces and the sides adapted to bear against the side walls of the groove in non-cutting relation are rounded.

12. The broach assembly defined in claim 6 in which the sides at the corners between the faces and the sides adapted to bear against the side walls of the groove in non-cutting relation are provided with a long lead.

No references cited.

WILLIAM W. DYER, JR., *Primary Examiner.*

HARRISON HINSON, *Examiner.*